(12) United States Patent
de Boer et al.

(10) Patent No.: US 9,017,472 B2
(45) Date of Patent: Apr. 28, 2015

(54) PROCESS FOR PREPARING A SULPHUR CEMENT PRODUCT

(75) Inventors: Paul de Boer, Amsterdam (NL); Yiu Chung Cheng, Amsterdam (NL); Michael David Lankshear, Amsterdam (NL); Catherine Frances Smura, Amsterdam (NL); Guy Lode Magda Maria Verbist, Amsterdam (NL); Willem Posthumus, AZ Eindhoven (NL)

(73) Assignee: Shell Oil Company, Houston, TX (US)

( * ) Notice: Subject to any disclaimer, the term of this patent is extended or adjusted under 35 U.S.C. 154(b) by 760 days.

(21) Appl. No.: 13/321,277

(22) PCT Filed: May 18, 2010

(86) PCT No.: PCT/EP2010/056794
§ 371 (c)(1),
(2), (4) Date: Apr. 2, 2012

(87) PCT Pub. No.: WO2010/133580
PCT Pub. Date: Nov. 25, 2010

(65) Prior Publication Data
US 2012/0186493 A1    Jul. 26, 2012

(30) Foreign Application Priority Data
May 20, 2009 (EP) ..................... 09160789

(51) Int. Cl.
C04B 28/36 (2006.01)
C04B 20/10 (2006.01)
(52) U.S. Cl.
CPC ............. *C04B 28/36* (2013.01); *C04B 20/1051* (2013.01)
(58) Field of Classification Search
USPC ............... 106/287.1, 287.11, 287.13, 287.14, 106/287.15, 287.19, 287.32, 270, 272
See application file for complete search history.

(56) References Cited

U.S. PATENT DOCUMENTS

| | | | |
|---|---|---|---|
| 4,122,062 A | 10/1978 | Monte et al. | 260/42.14 |
| 4,164,428 A | 8/1979 | Simic | 106/287.13 |
| 4,376,830 A | 3/1983 | Nimer et al. | 501/140 |
| 5,004,799 A | 4/1991 | Kohls et al. | 528/389 |
| 5,766,323 A | 6/1998 | Butler et al. | 106/2 |
| 7,833,341 B2 * | 11/2010 | Antens et al. | 106/287.1 |
| 8,137,456 B2 * | 3/2012 | Van Trier et al. | 106/815 |
| 8,815,005 B2 * | 8/2014 | Verbist et al. | 106/272 |
| 2007/0186823 A1 * | 8/2007 | Van Trier et al. | 106/806 |
| 2009/0241803 A1 | 10/2009 | Mahmoudkhani et al. | 106/709 |

FOREIGN PATENT DOCUMENTS

| | | |
|---|---|---|
| JP | 10114565 | 5/1998 |
| WO | WO200765920 | 6/2007 |
| WO | WO2008148804 | 12/2008 |

OTHER PUBLICATIONS

Czarnecki, B. et al; "The Effect of Mix Design on the Properties of Sulfur Concrete;" Cement, Concrete and Aggregates, American Society for Testing and Materials; Vo. 12, No. 2; pp. 79-86; Jan. 1, 1990.

* cited by examiner

*Primary Examiner* — David M Brunsman
(74) *Attorney, Agent, or Firm* — Charles W. Stewart

(57) ABSTRACT

A process for the preparation of a sulphur cement product is disclosed. Sulphur is mixed with a coupling agent and with a particulate inorganic material at a temperature at which sulphur is molten to obtain a molten sulphur cement product, which is solidified. The coupling agent is supplied as a solid composition comprising the coupling agent and at least 10 wt %, based upon the weight of the solid composition, of carrier material selected from one or more of wax, inorganic filler and polymer. The coupling agent is chosen from the group of organosilanes and organotitanates.

16 Claims, No Drawings

PROCESS FOR PREPARING A SULPHUR CEMENT PRODUCT

PRIORITY CLAIM

The present application claims priority from PCT/EP2010/056794, filed 18 May 2010, which claims priority from European Application 09160789.5, filed 20 May 2009.

FIELD OF THE INVENTION

The present invention provides a process for the preparation of a sulphur cement product; a process for preparing a solid composition for use in the process for preparing the sulphur cement product; and to a solid composition.

BACKGROUND OF THE INVENTION

Sulphur cement generally refers to a product comprising at least sulphur and a filler. To improve the properties of the sulphur cement, the sulphur may be modified using a sulphur modifier, e.g. naphthalene or olefinic compounds such as 5 ethylidene-2-norbornene (ENB) or 5 vinyl-2-norbornene (VNB), dicyclopentadiene, limonene or styrene. Typical sulphur cement fillers are particulate inorganic materials.

Sulphur cement-aggregate composites generally refer to a composite comprising both sulphur cement and aggregate. Examples of sulphur cement-aggregate composites are sulphur mortar, sulphur concrete and sulphur-extended asphalt.

It is known to use organosilane compounds as a stabilising agent in sulphur cement or sulphur cement-aggregate compositions to improve water stability. In WO 2007/65920, sulphur cement or a sulphur cement-aggregate composite is prepared by admixing an inorganic filler and a polysulphide-containing organosilane, mixing with molten sulphur and solidifying the admixture.

It is desirable to incorporate the organosilane into the sulphur prior to its use in the sulphur cement manufacturing plant, thereby avoiding the need for additional and potentially complex process steps at the manufacturing plant. Organosilanes are typically liquid reagents and it is preferable to use solid reagents in the manufacturing plant. WO 2008/148804 discloses a process wherein the organosilane is incorporated into a sulphur cement pre-composition. The sulphur cement pre-composition can be mixed with particulate inorganic material and optionally with additional sulphur to provide a sulphur cement product.

The present inventors have however found that the sulphur pre-composition of WO 2008/148804 may be liable to degradation if stored for an extended period, particularly if the weight percentage of organosilane is high. Additionally, the organosilanes and molten sulphur can exhibit poor miscibility, which may lead to phase separations when preparing sulphur cement products. The present inventors have therefore sought to provide a method for preparing sulphur cement products which does not suffer from the disadvantages of the prior art, in particular a pre-composition that may be stored and does not phase separate when preparing sulphur cement products.

SUMMARY OF THE INVENTION

Accordingly, the present invention provides a process for the preparation of a sulphur cement product comprising the steps of:
(a) mixing sulphur with a coupling agent and with a particulate inorganic material at a temperature at which sulphur is molten to obtain a molten sulphur cement product; and
(b) solidifying the molten sulphur cement product; wherein the coupling agent is chosen from the group of organosilanes and organotitanates, and wherein the coupling agent is supplied as a solid composition comprising the coupling agent and at least 10 wt %, based upon the weight of the solid composition, of carrier material selected from one or more of wax, inorganic filler and polymer.

The inventors have found that providing the coupling agent in the form of a solid composition comprising the coupling agent and carrier material, ensures a simple and effective process. The solid composition comprising the coupling agent is stable and can be stored for extended periods. The sulphur cement product is not adversely affected by the presence of the carrier agent in the product.

According to one embodiment of the invention, the present invention further provides a solid composition particularly suitable for use in the process of the present invention. The solid composition according to this embodiment of the invention comprises from 20 to 70 wt % of a coupling agent chosen from the group of organosilanes and organotitanates, from 20 to 60 wt % of wax or polymer, and from 10 to 50 wt % of inorganic filler, wherein the weight percentages are based upon the weight of the solid composition.

Solid compositions comprising coupling agents and a carrier material have previously been disclosed, e.g. in U.S. Pat. No. 5,766,323. However, the present inventors have devised a process wherein such compositions are advantageously used to prepare a sulphur cement product. Furthermore the present inventors have devised solid compositions, different to those previously disclosed, that are particularly suitable for use in the present invention.

DETAILED DESCRIPTION OF THE INVENTION

Reference herein to a sulphur cement product is to a sulphur cement or a sulphur cement-aggregate composite. A sulphur cement refers to a composition comprising sulphur or modified sulphur and a filler. Sulphur cement fillers are particulate inorganic materials with an average particle size of less than 0.1 mm. The filler content of sulphur cement may vary widely, but is preferably in the range of from 1 to 50 wt %, based on the total weight of the sulphur cement.

Sulphur cement-aggregate composites refer to a composite comprising both sulphur cement and a particulate inorganic material aggregate. Examples of sulphur cement-aggregate composites are sulphur mortar, sulphur concrete and sulphur-extended asphalt. Mortar comprises fine aggregate, typically with particles having an average diameter between 0.1 and 5 mm, for example sand, and does not comprise coarse aggregate. Concrete comprises coarse aggregate, typically with particles having an average diameter between 5 and 40 mm, and optionally comprises fine aggregate. Sulphur-extended asphalt comprises aggregate and a binder that contains filler and a residual hydrocarbon fraction (usually bitumen), wherein part of the binder has been replaced by sulphur, usually modified sulphur.

The sulphur that is mixed with the coupling agent and the particulate inorganic material is preferably supplied as elemental sulphur or modified sulphur (wherein elemental sulphur has been modified by inclusion of sulphur modifier, e.g. naphthalene or olefinic compounds such as 5 ethylidene-2-norbornene (ENB) or 5 vinyl-2-norbornene (VNB), dicyclopentadiene, limonene or styrene, incorporated in an amount from 0.1 to 10 wt % based on the weight of sulphur).

The sulphur is preferably supplied in the form of sulphur pellets. For the purpose of this specification, reference herein to "pellets" is to any type of regularly sized particle, including for example flakes, slates or sphere-shaped units such as prills, granules, nuggets and pastilles or half pea sized units.

The particulate inorganic material that is mixed with the coupling agent and the sulphur preferably has oxide or hydroxyl groups on its surface. Examples of suitable particulate inorganic materials are silica, fly ash, limestone, quartz, iron oxide, alumina, titania, carbon black, gypsum, talc or mica, sand, gravel, rock or metal-silicates. Such metal silicates are for example formed upon heating heavy metal containing sludge in order to immobilise the metals. More preferably the particulate inorganic material is a silica or a silicate. Examples of such silica or silicates are quartz, sand and metal-silicates (e.g. mica).

The particulate inorganic material may consist essentially of a filler material (with an average particle size of less than 0.1 mm) such that the sulphur cement product is a sulphur cement. The particulate inorganic material may comprise both filler and fine aggregate (with particles having an average diameter between 0.1 and 5 mm) such that the sulphur cement product is a sulphur mortar. The particulate inorganic material may comprise filler, coarse aggregate (with particles having an average diameter between 5 and 40 mm) and optionally fine aggregate (with particles having an average diameter between 0.1 and 5 mm) such that the sulphur cement product is a sulphur concrete.

The coupling agent is chosen from the group of organosilanes and organotitanates and is preferably an organosilane. The coupling agent may be a blend of two or more different coupling agents, e.g. an organosilane and an organotitanate, or two different organosilanes. Organosilanes are compounds having at least one carbon-silicon bond or at least one carbon-oxygen-silicon group, and organotitanates are compounds having at least one carbon-titanium bond or at least one carbon-oxygen-titanium group.

Preferred organosilanes are organosilanes of the general molecular formula (I):

$$(P^1)_3Si\text{-}A\text{-}Si(P^2)_3 \quad (I)$$

Wherein $P^1$ and $P^2$ are independently alkoxy, acyloxy, aryloxy, alkyl, aryl and halogen and A is a divalent functional group comprising one or more groups chosen from thiol, sulphide, amine or alkenyl groups.

More preferred organosilanes are organosilanes of the general molecular formula (II):

$$(R^1O)_3Si\text{-}A\text{-}Si(OR^2)_3 \quad (II)$$

wherein $R^1$ and $R^2$ are independently $C_{1-6}$ alkyl and A is a divalent functional group comprising one or more groups chosen from thiol, sulphide, amine or alkenyl groups. Preferably $R^1$ and $R^2$ are ethyl or methyl groups. Preferably A is a polysulphide group of formula $-(CH_2)_x-S_y-(CH_2)_z-$ wherein x is an integer from 1 to 4, y is an integer from 2 to 8, and z is an integer from 1 to 4. Most preferably x and z are the same and y is from 2 to 6. Particularly preferred organosilanes are bis(3-triethoxysilylpropyl)tetrasulphide and bis(3-triethoxysilylpropyl)disulphide.

The organosilane is alternatively of general formula (III):

$$(P^3)_3Si\text{-}A' \quad (III)$$

Wherein $P^1$ and $P^2$ are independently alkoxy, acyloxy, acyloxy, alkyl, aryl and halogen and A' is an univalent functional group comprising one or more groups chosen from thiol, sulphide, amine or alkenyl groups.

According to another embodiment, the organosilane is preferably of general formula (IV):

$$(R^3O)_3Si\text{-}A' \quad (IV)$$

wherein $R^3$ is $C_{1-6}$ alkyl and A' is a univalent functional group comprising one or more groups chosen from thiol, sulphide, amine or alkenyl groups. Preferably $R^3$ is an ethyl or methyl group. Preferably, A' is a thiol group or sulphide group, having the formula $-(CH_2)_p-S_q-(CH_2)_r-H$, wherein p is an integer from 1 to 4, q is an integer from 1 to 8 and r is 0 or an integer from 1 to 4. In one embodiment, q is 1 and r is 0, such that A' is a thiol group. In another embodiment, q is from 2 to 8 and r is from 1 to 4, such that A' is a polysulphide group. In another preferred embodiment, A' is a primary amine group of formula $-(CH_2)_n-NH_2$, wherein n is an integer from 1 to 4. In yet another preferred embodiment, A' is an alkenyl group of formula $-(CH_2)_m-X$, wherein m is an integer from 0 to 4 and X is an alkenyl group. Possible X groups are shown below:

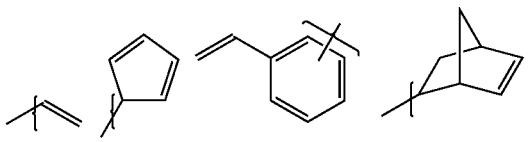

Preferred organotitanates are of general formula (V) or (VI):

wherein $OR^4$, $OR^5$ and $OR^6$ are independently chosen from acyloxy, phosphato, pyrophosphato, sulfonato and glycoxy; and ZO and Z'O are independently chosen from alkoxy or neoalkoxy group or ZO and Z'O together form a glycoxy group. The $OR^4$, $OR^5$ and $OR^6$ groups are preferably acyloxy, dialkyl phosphato, dialkyl pyrophosphato or alkylbenzene sulfonato groups. If ZO and/or Z'O are alkoxy groups, Z and/or Z' are preferably $C_1$-$C_{25}$ alkyl. Z and Z' are most preferably isopropyl. Organotitanates with neoalkoxy groups are described further in U.S. Pat. No. 4,623,738.

Alternatively the organotitanates may be as described in WO 2008/152054.

Step (a) is carried out at a temperature at which sulphur is molten, i.e. typically above 120° C., preferably in the range of from 120 to 150° C., more preferably in the range of from 125 to 140° C.

Optionally further ingredients such as sulphur modifiers may be admixed during step (a). Sulphur modifiers may be added in an amount in the range of from 0.1 to 10 wt % based on the weight of sulphur. Such modifiers are known in the art. Examples of such modifiers are aliphatic or aromatic polysulphides or compounds that form polysulphides upon reaction with sulphur. Examples of compounds that form polysulphides are naphthalene or olefinic compounds such as 5 ethylidene-2-norbornene (BNB) or 5 vinyl-2-norbornene (VNB), dicyclopentadiene, limonene or styrene.

In step (b) the molten sulphur cement product is solidified by cooling the product to a temperature at which the sulphur solidifies.

The coupling agent is supplied to step (a) as a solid composition comprising the coupling agent and at least 10 wt %, based upon the weight of the solid composition, of carrier material selected from one or more of wax, inorganic filler and polymer.

According to a preferred embodiment, the solid composition comprises wax as carrier material and the coupling agent is prepared by
(a) providing an aqueous solution of an oligosulphide by reacting a compound of formula (VII):

$$M_mS_n \quad \quad (VII)$$

wherein M is a nitrogen-containing cation, a phosphorus-containing cation or a metal atom, m is 1 or 2 and n is from 1 to 8, or M is hydrogen, m is 2 and n is 1 with molten sulphur;
(b) providing a compound of formula (VIII):

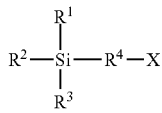

(VIII)

wherein $R^1$, $R^2$ and $R^3$ are independently chosen from alkoxy, acyloxy, aryloxy, alkyl, aryl and halogen, preferably C1-C6 alkoxy, wherein $R^4$ is alkylene and wherein X is a leaving group chosen from the group consisting of halogen, carboxylate, nitro, azide, thiocyanate, ammonium, phosphonium and sulfonate dissolved in a molten hydrophobic wax;
(c) reacting the aqueous solution of step (a) with the molten wax solution of step (b) by mixing the two solutions in the presence of a phase transfer catalyst;
(d) separating the aqueous solution from the molten wax solution and cooling the molten wax solution to a temperature at which the molten wax solidifies to obtain the solid composition.

Preferably, in formula (VII) M is sodium; m is 2 and n is 1. It will be appreciated that compounds of formula (VII) may contain so-called crystal water. A preferred compound of formula (VII) is $Na_2S \cdot xH_2O$.

The molar ratio of the compound of formula (VIII) to the compound of formula (VII) is preferably between 10:1 and 1:1, more preferably between 5:1 and 1.5:1, most preferably about 2:1.

In principle any phase transfer catalysts may be used. Examples of preferred phase transfer catalysts are quaternary ammonium or phosphonium salts. In view of the high costs of phosphonium salts, more preferably the phase transfer catalyst is a tetra-alkyl ammonium salt, wherein at least one alkyl group is a C3-C20 alkyl group, more preferably a C4-C12 group, even more preferably a C4 to C6 group.

Preferably, the counter ion in the quaternary ammonium or phosphonium salt is a monovalent ion, more preferably bromide. Good results have been obtained with tetra-butyl ammonium bromide; tetra-octyl ammonium bromide; and cetyl tri-methyl ammonium bromide, in particular tetra-butyl ammonium bromide.

The temperature at which the reaction is carried out is preferably in the range from 70 to 105° C., even more preferably 75 to 95° C.

The reaction is typically carried out in the liquid phase.

The reaction time typically varies with the temperature used, but generally will be in the range from 2 to 5 hours.

The solid composition is preferably supplied to step (a) in the form of pellets. For the purpose of this specification, reference herein to "pellets" is to any type of regularly sized particle, for example flakes, slates or sphere-shaped units such as prills, granules, nuggets and pastilles or half pea sized units.

The solid composition that is supplied to step (a) preferably comprises at least 10 wt % of the coupling agent, based upon the weight of the solid composition, more preferably at least 15 wt %, more preferably at least 20 wt %, even more preferably at least 30 wt %. The solid composition preferably comprises less than 80 wt % of the coupling agent, based upon the weight of the solid composition, more preferably less than 65 wt % and even more preferably less than 60 wt %, and even more preferably less than 50 wt %. Preferably the solid composition comprises from 20 to 60 wt % of the coupling agent, for example 30 to 60 wt %, more preferably 20 to 50 wt %. It is desirable to maximise the amount of coupling agent in the composition as this is the agent that improves the properties of the sulphur cement product. However, if the amount of coupling agent is too high, it may not be possible to produce a solid composition (many of the coupling agents are liquid) and the solid composition may not be stable under the desired storage and transport conditions.

The solid composition that is supplied to step (a) comprises at least 10 wt %, based upon the weight of the solid composition, of carrier material selected from one or more of wax, inorganic filler and polymer. More preferably the solid composition comprises at least 40 wt % of carrier material and most preferably the solid composition comprises at least 50 wt % of carrier material. Preferably the solid composition comprises from 50 to 80 wt % of the carrier material. The amount of carrier material must be sufficient to achieve a solid and stable composition.

The solid composition may comprise further components in addition to the coupling agent and the carrier material, but preferably the coupling agent and the carrier material provide at least 80 wt % of the solid composition, more preferably at least 90 wt % of the solid composition. In a preferred embodiment, the solid composition consists essentially of the coupling agent and the carrier material. The solid composition preferably comprises less than 5 wt % elemental sulphur, and preferably does not comprise elemental sulphur.

The carrier material is selected from one or more of wax, inorganic filler and polymer. Preferably, the carrier material comprises wax. More preferably the carrier material comprises wax and an inorganic filler.

The wax is preferably a paraffin wax, such as a paraffin wax resulting from a Fischer-Tropsch process. Fischer-Tropsch waxes are known to those skilled in the art. A detailed account of Fischer-Tropsch waxes was published as "Fischer-Tropsch Waxes", ISBN 0620075600, on 13 Mar. 1984, ed. J H Le Roux and S Oranje; published by Sasol One (PTY) Ltd and SasolChem (PTY Ltd), Republic of South Africa. Fischer-Tropsch waxes are available commercially from Sasol and Shell MDS (Malaysia) Shd Bhd. The latter products have for example been described in "The Markets for Shell Middle Distillate Synthesis Products", presentation by Peter Tijm, Shell International Gas Ltd., Alternative Energy '95, Vancouver, Canada, May 2-4, 1995.

Typically, the Fischer-Tropsch waxes have been hydrogenated and/or hydrofinished to remove or substantially reduce any olefins or oxygenates formed in the Fischer-Tropsch reaction. A preferred Fischer-Tropsch synthesis process is disclosed in WO-A-9934917. The synthesis product as directly obtained in the Fischer-Tropsch process is preferably hydrogenated in order to remove any oxygenates and saturate any olefinic compounds present in such a product. Such a hydrotreatment is described in for example EP-B-0668342. A preferred process for preparing Fischer-Tropsch waxes is disclosed in U.S. Pat. No. 5,486,542.

Preferably, the paraffin wax comprises at least 80% mol, more preferably at least 85% mol., even more preferably at least 90 mol % of straight chain alkanes, as determined using a $^{13}$C NMR. This method determines an average molecular weight for the wax and subsequently determines the mol percentage of molecules having an methyl branch, the mol percentage of molecules having an ethyl branch, the mol percentage of molecules having a $C_3$ branch and the mol percentage having a $C_4^+$ branch, under the assumption that each molecule does not have more than one branch. The mol % of branched alkanes is the total of these individual percentages. Preferably the alkane chain length is in the range from about C30 to about C100 or even higher.

Preferably, the congealing point (ASTM D938) of the wax is from 60 to 130° C., more preferably from 70 to 120° C., even more preferably 70 to 110° C. Even more preferably, the congealing point of the wax used is from 70 to 95° C., especially if the coupling agent is produced by reacting by mixing an aqueous solution of an oligosulphide with a compound of formula (VIII) in a hydrophobic molten wax phase in the presence of a phase transfer catalyst.

Preferably, the wax has an oil content (ASTM D721) of less than 5% wt, more preferably less than 2% wt, even more preferably less than 1% wt.

The wax may also be a refined slack wax. Slack wax is a crude wax produced by chilling and solvent filter-pressing wax distillate in refinery operations. A refined slack wax is a slack wax that has been subjected to a hydrotreating operation prior to or after separation from the wax containing distillate.

According to another preferred embodiment, the wax is a microcrystalline wax. Microcrystalline waxes are known in the art and available commercially. It has been found that microcrystalline wax is particularly preferred if it is desired not to use inorganic filler in the solid composition as the presence of microcrystalline wax results in a particularly stable solid composition.

According to a particularly preferred embodiment, the solid composition comprises an inorganic filler and a blend of 10 to 90% wt of Fischer-Tropsch wax containing at least 80% mol straight chain alkanes and 90 to 10% wt. of a microcrystalline wax, based on the total amount of wax present.

Preferably the carrier material comprises from 25 to 75 wt % wax, based upon the weight of the carrier material.

The inorganic filler is preferably chosen from one or more of carbon black, metal carbonates (e.g. calcium carbonate), silica, titania, iron oxide, alumina, asbestos, fly ash, limestone, quartz, gypsum, talc, mica, metal silicates (e.g. calcium silicate) or powdered elemental sulphur. Most preferably the inorganic filler is carbon black, silica, calcium carbonate or calcium silicate. The average particle size of the inorganic filler is preferably in the range of from 0.1 μm to 0.1 mm. Preferably the carrier material comprises from 25 to 75 wt % of inorganic filler, based upon the weight of the carrier material.

The carrier material may comprise polymer such as polyethylene or an ethylene copolymer (e.g. ethylene vinyl acetate).

The present invention further provides a solid composition particularly suitable for use in the process of the present invention. The solid composition comprises from 20 to 70 wt % of a coupling agent chosen from the group of organosilanes and organotitanates, from 20 to 60 wt % of wax or polymer, and from 10 to 50 wt % of inorganic filler, wherein the weight percentages are based upon the weight of the solid composition. Preferably the solid composition comprises from 20 to 70 wt % of a coupling agent chosen from the group of organosilanes and organotitanates, from 20 to 60 wt % of wax, and from 10 to 50 wt % of inorganic filler. The preferred organosilanes and organotitanates, waxes and inorganic filler are as outlined above for the process of the invention. Most preferably the solid composition comprises from 20 to 70 wt % coupling agent, from 20 to 60 wt % wax and from 15 to 30 wt % inorganic filler.

In a preferred embodiment of the process of the invention, the sulphur is supplied in the form of pellets and the solid composition comprising the coupling agent is supplied in the form of pellets. Therefore, the present invention further provides a mixture of sulphur pellets and solid composition pellets, wherein the solid composition comprises a coupling agent chosen from the group of organosilanes and organotitanates, and at least 10 wt %, based upon the weight of the solid composition, of carrier material selected from one or more of wax, inorganic filler and polymer. This mixture of sulphur pellets and solid composition pellets can be provided to step (a) of the process of the invention such that sulphur and coupling agent are mixed with particulate inorganic material at a temperature at which sulphur is molten. The preferred weight ratio of sulphur pellets to solid composition pellets is from 997:3 to 97:3, preferably from 995:5 to 985:15. Most preferably the solid composition pellets comprise from 20 to 70 wt % coupling agent, from 20 to 60 wt % wax and from 10 to 50 wt % inorganic filler.

In another embodiment of the invention the coupling agent is two or more different coupling agents, e.g. an organosilane and an organotitanate, or two different organosilanes, and the different coupling agents are supplied as different solid compositions.

The sulphur cement product produced by the process, of the present invention is suitable for use in typical sulphur cement product applications. A sulphur cement produced by the process can be combined with aggregate to provide a sulphur-cement aggregate composite. Sulphur concrete produced by the process of the present invention can be moulded to provide products such as paving materials and sea defenses.

EXAMPLES

The invention is further illustrated by means of the following non-limiting examples.

Preparation of Pellets Comprising Coupling Agent

The coupling agent used in all examples was bis(3-triethyoxysilylpropyl)tetrasulphide (TESPT). Pellets were prepared by hot-blending the TESPT, wax and inorganic filler. The inorganic filler was first mixed with the TESPT, then wax was added. Heat was applied such that the wax melted and a homogeneous suspension was obtained. The suspension was then poured onto a thin tray, allowed to cool, then broken mechanically into small (1-2 cm width, 2-4 mm thickness) chunks.

The pellet formulations are given in table 1. Wax type 1 is a Fischer Tropsch paraffin wax with a congealing point in the range of 95-105° C. Wax type 2 is a Fischer Tropsch paraffin wax with a congealing point in the range of 100-110° C. The carbon black was N115 carbon black from Evonik. The calcium carbonate is Wigro calcium carbonate. The titania was P25 titania from Evonik.

TABLE 1

|  | TESPT | Wax | Inorganic filler |
|---|---|---|---|
| Example 1 | 47 wt % | Type 1<br>35 wt % | Carbon black<br>18 wt % |
| Example 2 | 35 wt % | Type 1<br>52 wt % | Carbon black<br>13 wt % |
| Example 3 | 25 wt % | Type 2<br>50 wt % | Carbon black<br>25 wt % |
| Example 4 | 60 wt % | Type 2<br>20 wt % | Titania<br>20 wt % |
| Example 5 | 55 wt % | Type 2<br>28 wt % | Carbon black<br>17 wt % |
| Example 6 | 24 wt % | Type 2 | Calcium carbonate |

TABLE 1-continued

|  | TESPT | Wax | Inorganic filler |
|---|---|---|---|
| Example 7 | 31 wt % | 28 wt %<br>Type 2<br>38 wt % | 48 wt %<br>Calcium carbonate<br>31 wt % |

Aging of Pellets

The pellets were aged by treating under water for 7 days at 70° C. Successful resistance to aging was measured on the basis of a number of criteria: turbidity of water (none); release of $H_2S$ or $SO_2$ into the aging vessel headspace (none); change in appearance or consistency of the pellets (none); performance of the mortar prepared with the aged pellets with respect to water intrusion and flexural strength, when compared to both the non-aged pellets and a mortar of identical composition but not using a pre-pelletisation step.

Preparation of Sulphur Mortars

Mortars were prepared using fresh pellets, aged pellets and also using a non-pellet approach wherein all the components (TESPT, wax, inorganic filler) were used in the same amounts but not in the form of a pellet. For each mortar the amount of TESPT was standardised to 0.06 wt %, based upon the weight of the sulphur mortar.

Two different methods were used to prepare sulphur mortars:

Method A: Sand (56.3 wt %) and filler (fly ash, 19.0 wt %) were pre-heated in an oven at 150° C. while sulphur was pre-heated at 65° C. The sand was transferred to an oil-heated steel bowl (the temperature of the bowl was 150° C.). The pellets (or in case of no pellets the ingredients separately) were added. After three to five minutes sulphur was added to the sand and pellets and mixed until homogeneous. The mixture was then stirred and heated until the sulphur was molten. The fly-ash was subsequently added to the mix. This mixture was then stirred until uniform. The mixture was transferred into three pre-heated silicon moulds and cooled down to room temperature before demoulding.

Method B: 1057.5 g of preheated sand and pellets (or in case of no pellets the ingredients separately) were mixed. 560.07 g of preheated sulphur was subsequently added. 630 g of preheated quartz was added and mixed for 5 minutes after homogenisation. The molten product was transferred into preheated silicon moulds, thereby producing three sulphur mortar prisms after cooling.

Properties of Sulphur Mortars

The water intrusion after 14 days, expressed as a weight percentage, of the mortar samples was measured and is given in table 2. The flexural strength before and after water aging of the sulphur mortar was measured by a three point bending test (using Toni Technik apparatus) and the results are given in Table 2.

TABLE 2

| Pellet<br>Composition | Aging of<br>pellet<br>Pass/Fail | Water intrusion after<br>14 days (%) | | | Flexural strength before/after<br>water aging (N/mm$^2$) | | |
|---|---|---|---|---|---|---|---|
|  |  | No pellet | Non-aged<br>pellet | Aged<br>pellet | No pellet | Non-aged<br>pellet | Aged<br>pellet |
| Example 1 | Pass | 0.08 | 0.08 | 0.04 | 9.5/8.8 | 9.3/9.8 | 10.4/11.8 |
| Example 2 | Pass | — | 0.08 | 0.05 | — | 9.0/7.7 | 9.7/9.5 |
| Example 3 | Pass | 0.05 | 0.07 | 0.08 | 12.2/12.2 | 9.7/9.4 | 10.4/8.6 |
| Example 4 | Pass | 0.08 | 0.10 | 0.46 | 9.8/11.5 | 10.4/10.8 | 10.3/9.9 |
| Example 5 | Fail | 0.04 | 0.07 | 0.4 | 12.0/12.6 | 9.7/10.3 | 9.6/9.9 |
| Example 6 | Pass | 0.15 | — | 0.06 | 11.3/9.9 | — | 11.1/9.7 |
| Example 7 | Pass | — | — | 0.05 | — | — | 10.4/10.3 |

The sulphur mortars prepared from the fresh pellets had comparable properties to those prepared using the no-pellet (separate ingredients) route. The water intrusion and flexural strength properties are not adversely affected by the inclusion of the carrier materials. The sulphur mortars prepared from the aged pellets also show good water intrusion and flexural strength properties, indicating the pellets are stable and can be used after having been stored.

The pellets of Example 4 passed the aging text but did not disassociate when incorporated into sulphur mortar. This means that the TESPT coupling agent cannot be homogeneously dispersed throughout the sulphur mortar, as is desirable.

The pellets of Example 5 failed the aging test because the surface of the pellets had white spots and the water became turbid. The sulphur mortars prepared using the aged pellets of example 5 showed good flexural strength but did not have the dark appearance of the mortars prepared using the non-aged pellets and prepared without pellets.

Example 8

Preparation of a Solid Composition Comprising TESPT

In a roundbottom flask with a condenser and a magnetic stirrer, 1.92 g (0.06 mol) sulfur pellets (Shell), 2.60 g (0.02 mol) Na2S.xH20 60% flakes (Aldrich), 2.0 g water, 0.10 g Tetrabutylammonium bromide (Aldrich), and 9.92 g paraffin wax mp 73-80 (Aldrich) were mixed and heated to 90° C. Once the solids had dissolved 9.94 g (0.04 mol) 3-chloropropyltriethoxysilane was added (Aldrich). After 3 hours the stirrer was stopped upon which two layers with a sharp boundary formed rapidly: an upper layer of paraffin wax with silane and a bottom layer with dissolved salts. The two layers were separated. NMR analysis showed 90% conversion of the 3-chloropropyltriethoxysilane to TESPT and only 2% hydrolysis for the silane ethoxy groups.

Examples 9-21

The procedure of Example 8 was repeated but with variations of type and quantity of phase transfer catalyst (PTC), presence of a pH-buffer; amount of water and paraffinic wax; and variation in reaction temperature. Results are depicted in Table 3.

TABLE 3

| Ex. | PTC | (g) | Buffer | H2O (g) | Wax (g) | T (°C.) | C* (%) |
|---|---|---|---|---|---|---|---|
| 9 | TBAB | 0.20 | — | 0 | 2.0 | 10 | 100 | 90 |
| 10 | TBAB | 0.20 | — | 0 | 2.0 | 10 | 110 | 80 |
| 11 | TBAB | 0.20 | — | 0 | 10 | 12 | 100 | 80 |
| 12 | TBAB | 0.20 | — | 0 | 2.0 | 4.0 | 90 | 90 |
| 13 | TBAB | 0.20 | — | 0 | 2.0 | 2.7 | 90 | 80 |
| 14 | TBAB | 0.21 | NaHCO3 | 6.0 | 17 | 10 | 90 | 95 |
| 15 | TBAB | 0.21 | NaHCO3 | 2.0 | 4.0 | 10 | 90 | 99 |
| 16 | TBAB | 0.20 | NaHCO3 | 1.0 | 5.0 | 10 | 90 | 97 |
| 17 | TOAB | 0.20 | — | 0 | 2.1 | 10 | 90 | 57 |
| 18 | TOAB | 0.34 | NaHCO3 | 6.0 | 19 | 10 | 90 | 50 |
| 19 | CTAB | 1.43 | — | 0 | 30 | 10 | 90 | 90 |
| 20 | CTAB | 0.50 | NaHCO3 | 7.1 | 19 | 10 | 90 | 80 |
| 21 | CTAB | 0.40 | — | 0 | 29 | 10 | 90 | 90 |

C* = conversion
TBAB = tetrabutyl ammonium bromide
TOAB = tetraoctyl ammonium bromide
CTAB = cetyl trimethyl ammonium bromide After three hours it is expected that hydrolysis would be in the same order as obtained for Example 8.

What is claimed is:

1. A process for the preparation of a sulphur cement product comprising the steps of:
   (a) mixing sulphur with a solid composition, comprising at least 10 wt %, based on the weight of the solid composition, a coupling agent and at least 10 wt %, based upon the weight of the solid composition, wax and an inorganic filler, and with a particulate inorganic material at a temperature at which sulphur is molten to obtain a molten sulphur cement product; and
   (b) solidifying the molten sulphur cement product;
   wherein the coupling agent is chosen from the group of organosilanes and organotitanates.

2. A process according to claim 1, wherein the sulphur is supplied to step (a) in the form of sulphur pellets.

3. A process according to claim 1, wherein the coupling agent is an organosilane having the general molecular formula (I):

$$(P^1)_3Si\text{-}A\text{-}Si(P^2)_3 \quad (I)$$

Wherein $P^1$ and $P^2$ are independently alkoxy, acyloxy, aryloxy, alkyl, aryl and halogen and A is a divalent functional group comprising one or more groups chosen from thiol, sulphide, amine or alkenyl groups or an organosilane having the general molecular formula (III):

$$(P^3)_3Si\text{-}A' \quad (III)$$

Wherein $P^1$ and $P^2$ are independently alkoxy, acyloxy, aryloxy, alkyl, aryl and halogen and A' is an univalent functional group comprising one or more groups chosen from thiol, sulphide, amine or alkenyl groups.

4. A process for preparing a solid composition for use in a process as claimed in claim 3 which comprises
   (a) providing an aqueous solution of an oligosulphide by reacting a compound of formula (VII):

$$M_mS_n \quad (VII)$$

wherein M is a nitrogen-containing cation, a phosphorus-containing cation or a metal atom, m is 1 or 2 and n is from 1 to 8, or M is hydrogen, m is 2 and n is 1 with molten sulphur;
   (b) providing a compound of formula (VIII):

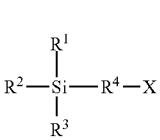

(VIII)

wherein $R^1$, $R^2$ and $R^3$ are independently chosen from alkoxy, acyloxy, aryloxy, alkyl, aryl and halogen, preferably C1-C6 alkoxy, wherein $R^4$ is alkylene and wherein X is a leaving group chosen from the group consisting of halogen, carboxylate, nitro, azide, thiocyanate, ammonium, phosphonium and sulfonate, dissolved in a molten hydrophobic wax;
   (c) reacting the aqueous solution of step (a) with the molten wax solution of step (b) by mixing the two solutions in the presence of a phase transfer catalyst;
   (d) separating the aqueous solution from the molten wax solution and cooling the molten wax solution to a temperature at which the molten wax solidifies to obtain the solid composition.

5. A process according to claim 1, wherein the coupling agent is an organosilane having the general molecular formula (II):

$$(R^1O)_3Si\text{-}A\text{-}Si(OR^2)_3 \quad (II)$$

wherein $R^1$ and $R^2$ are independently $C_{1-6}$ alkyl and A is a divalent functional group comprising one or more groups chosen from thiol, sulphide, amine or alkenyl groups.

6. A process according to claim 5, wherein A is a polysulphide group of formula —$(CH_2)_x$—$S_y$—$(CH_2)_z$— wherein x is an integer from 1 to 4, y is an integer from 2 to 8, and z is an integer from 1 to 4.

7. A process according to claim 1, wherein the solid composition is supplied to step (a) in the form of pellets.

8. A process according to claim 1, wherein the solid composition comprises from 20 to 70 wt % of the coupling agent, from 20 to 60 wt % of the wax, and from 10 to 50 wt % of the inorganic filler.

9. A process according to claim 8, wherein the inorganic filler is selected from the group consisting of carbon black, silica, calcium carbonate and calcium silicate.

10. A process according to claim 9, wherein the inorganic filler comprises particles of average particle size in the range of from 0.1 μm to 0.1 mm.

11. A process for the preparation of a sulphur cement product comprising the steps of:
   (a) mixing sulphur with a coupling agent and with a particulate inorganic material at a temperature at which sulphur is molten to obtain a molten sulphur cement product; and
   (b) solidifying the molten sulphur cement product;
   wherein the coupling agent is chosen from the group of organosilanes and organotitanates, and wherein the coupling agent is supplied as a solid composition comprising the coupling agent and at least 10 wt %, based upon the weight of the solid composition, of carrier material selected from one or more of wax, inorganic filler and polymer, wherein the coupling agent is an organosilane having the general molecular formula (I), and wherein the solid composition comprises wax as carrier material and the coupling agent is prepared by (a) providing an aqueous solution of an oligosulphide by reacting a compound of formula (VII):

$$M_mS_n \qquad (VII)$$

wherein M is a nitrogen-containing cation, a phosphorus-containing cation or a metal atom, m is 1 or 2 and n is from 1 to 8, or M is hydrogen, m is 2 and n is 1 with molten sulphur;

(b) providing a compound of formula (VIII):

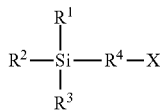
(VIII)

wherein $R^1$, $R^2$ and $R^3$ are independently chosen from alkoxy, acyloxy, aryloxy, alkyl, aryl and halogen, preferably C1-C6 alkoxy, wherein $R^4$ is alkylene and wherein X is a leaving group chosen from the group consisting of halogen, carboxylate, nitro, azide, thiocyanate, ammonium, phosphonium and sulfonate, dissolved in a molten hydrophobic wax;

(c) reacting the aqueous solution of step (a) with the molten wax solution of step (b) by mixing the two solutions in the presence of a phase transfer catalyst;

(d) separating the aqueous solution from the molten wax solution and cooling the molten wax solution to a temperature at which the molten wax solidifies to obtain the solid composition.

12. A solid composition comprising from 20 to 70 wt % of a coupling agent chosen from the group of organosilanes and organotitanates, from 20 to 60 wt % of wax or polymer, and from 10 to 50 wt % of inorganic filler, wherein the weight percentages are based upon the weight of the solid composition.

13. A solid composition according to claim 12, comprising from 20 to 50 wt % coupling agent, from 30 to 50 wt % wax and from 15 to 30 wt % inorganic filler.

14. A solid composition according to claim 12, wherein the coupling agent is an organosilane having the general molecular formula (II):

$$(R^1O)_3Si\text{-}A\text{-}Si(OR^2)_3 \qquad (II)$$

wherein $R^1$ and $R^2$ are independently $C_{1-6}$ alkyl, and A is a divalent functional group comprising one or more groups chosen from thiol, sulphide, amine or alkenyl groups; wherein the wax is a paraffin wax having a melting point of from 70 to 120° C.; and the inorganic filler is carbon black, calcium carbonate, calcium silicate or titania.

15. A mixture of sulphur pellets and solid composition pellets, wherein the solid composition comprises a at least 10 wt. %, based on the weight of the solid composition, of a coupling agent chosen from the group of organosilanes and organotitanates, and at least 10 wt %, based upon the weight of the solid composition, of carrier material selected from one or more of wax, inorganic filler and polymer.

16. A mixture according to claim 15, wherein the solid composition pellets consist of a solid composition comprising from 20 to 70 wt % of a coupling agent chosen from the group of organosilanes and organotitanates, from 20 to 60 wt % of wax or polymer, and from 10 to 50 wt % of inorganic filler, wherein the weight percentages are based upon the weight of the solid composition.

* * * * *